United States Patent
Park

(10) Patent No.: US 11,414,097 B2
(45) Date of Patent: Aug. 16, 2022

(54) APPARATUS FOR GENERATING POSITION DATA, AUTONOMOUS VEHICLE AND METHOD FOR GENERATING POSITION DATA

(71) Applicant: LG Electronics Inc., Seoul (KR)

(72) Inventor: Yongsoo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 151 days.

(21) Appl. No.: 16/500,308

(22) PCT Filed: Jul. 4, 2019

(86) PCT No.: PCT/KR2019/008208
§ 371 (c)(1),
(2) Date: Oct. 2, 2019

(87) PCT Pub. No.: WO2021/002518
PCT Pub. Date: Jan. 7, 2021

(65) Prior Publication Data
US 2021/0362739 A1    Nov. 25, 2021

(51) Int. Cl.
*B60W 60/00* (2020.01)
*G06T 7/70* (2017.01)
*B60W 40/08* (2012.01)
*B60W 40/12* (2012.01)
*B60W 50/10* (2012.01)

(52) U.S. Cl.
CPC .......... *B60W 60/001* (2020.02); *B60W 40/08* (2013.01); *B60W 40/12* (2013.01); *B60W 50/10* (2013.01); *G06T 7/70* (2017.01); *B60W 2420/42* (2013.01); *B60W 2552/00* (2020.02); *B60W 2556/65* (2020.02); *G06T 2207/30252* (2013.01)

(58) Field of Classification Search
CPC ...... B60W 40/04; B60W 40/08; B60W 40/12; B60W 2040/0881; B60W 50/10; B60W 60/001; B60W 60/0011; B60W 60/0016; B60W 60/0017; B60W 2420/42; B60W 2540/00; B60W 2540/01; B60W 2540/041; B60W 2552/00; B60W 2552/45; B60W 2552/20; B60W 2556/45; B60W 2556/65; B60W 2556/50; B60W 2720/24; B60W 2710/20; G06T 7/70; G06T 2207/30196; G06T 2207/30248; G06T 2207/30252
See application file for complete search history.

(56) References Cited

U.S. PATENT DOCUMENTS

| | | | |
|---|---|---|---|
| 7,457,456 B2 * | 11/2008 | Miyoshi | G06T 3/00 382/154 |
| 10,190,357 B2 * | 1/2019 | Kothari | E05F 15/76 |
| 10,937,178 B1 * | 3/2021 | Srinivasan | G06T 7/70 |
| 2015/0066349 A1 * | 3/2015 | Chan | G01C 21/26 701/400 |

(Continued)

*Primary Examiner* — Russell Frejd
*Assistant Examiner* — Brandon Z Willis
(74) *Attorney, Agent, or Firm* — Fish & Richardson P.C.

(57) ABSTRACT

Disclosed is an apparatus for generating position data including a processor which acquires position information of an antenna installed in a vehicle, generates position data of the vehicle based on the position information of the antenna, acquires information about change in an external appearance of the vehicle, and corrects the position data of the vehicle based on the information about the change in the external appearance of the vehicle.

13 Claims, 12 Drawing Sheets

(56) References Cited

U.S. PATENT DOCUMENTS

2015/0360625 A1* 12/2015 Randler .................. H04N 7/18
                                                            348/148
2019/0039614 A1* 2/2019 Nagata ................. B60W 30/09

* cited by examiner

APPARATUS FOR GENERATING POSITION DATA, AUTONOMOUS VEHICLE AND METHOD FOR GENERATING POSITION DATA

CROSS-REFERENCE TO RELATED APPLICATION

This application is a National Stage application under 35 U.S.C. § 371 of International Application No. PCT/KR2019/008208, filed Jul. 4, 2019, which is incorporated by reference.

TECHNICAL FIELD

The present invention relates to an apparatus for generating position data, an autonomous vehicle and a method for generating position data.

BACKGROUND ART

In general, vehicles are apparatuses which a user may drive in a desired direction. An automobile is a representative example thereof. An autonomous vehicle means a vehicle which is capable of autonomously driving itself without human intervention. The autonomous vehicle must provide position information to a server or other vehicles. The position of the autonomous vehicle may be provided as a point. Other vehicles or the server having received the position information of the autonomous vehicle may recognize the autonomous vehicle and generate a path, based on the position information of the autonomous vehicle. Other vehicles or the server recognizes the autonomous vehicle by applying the overall length, overall width and overall height of the autonomous vehicle to the received point. If the volume of the autonomous vehicle is changed, a precise point of the position of the autonomous vehicle is not provided, and thus, there is the risk of an accident. That is, in the above conventional method of providing position information of a vehicle, if the volume of the vehicle is increased, i.e., if baggage is loaded into the vehicle or a door of the vehicle is opened, detailed information about such a situation is not provided to other vehicles.

DISCLOSURE

Technical Problem

Therefore, the present invention has been made in view of the above problems, and it is an object of the present invention to provide an apparatus and method for generating position data in which corrected position information of a vehicle is generated in consideration of a change in the volume of the vehicle or a person getting into/out of the vehicle.

It is a further object of the present invention to provide an autonomous vehicle including the apparatus for generating position data.

Objects of the present invention are not limited to the above-described objects, and other objects which are not stated above will be more clearly understood from the following detailed description.

Technical Solution

In accordance with an aspect of the present invention, the above and other objects can be accomplished by the provision of an apparatus for generating position data, including a processor, which acquires position information of an antenna installed in a vehicle, generates position data of the vehicle based on the position information of the antenna, acquires information about change in an external appearance of the vehicle, corrects the position data of the vehicle based on the information about the change in the external appearance of the vehicle.

Details of other aspects will be included in the following description and drawings.

Advantageous Effects

The present invention has one or more of the following effects.

First, the size of a vehicle is accurately reflected, and thus, a dangerous situation may be precisely avoided.

Second, when the vehicle is stopped, a passenger of the vehicle is reflected in change in the external appearance of the vehicle, and danger to the passenger may be avoided.

Effects of the present invention are not limited to the above-described effects, and other various effects of the invention will be directly or implicitly set forth in the following detailed description and the accompanying claims.

BEST MODE

Figure 1:
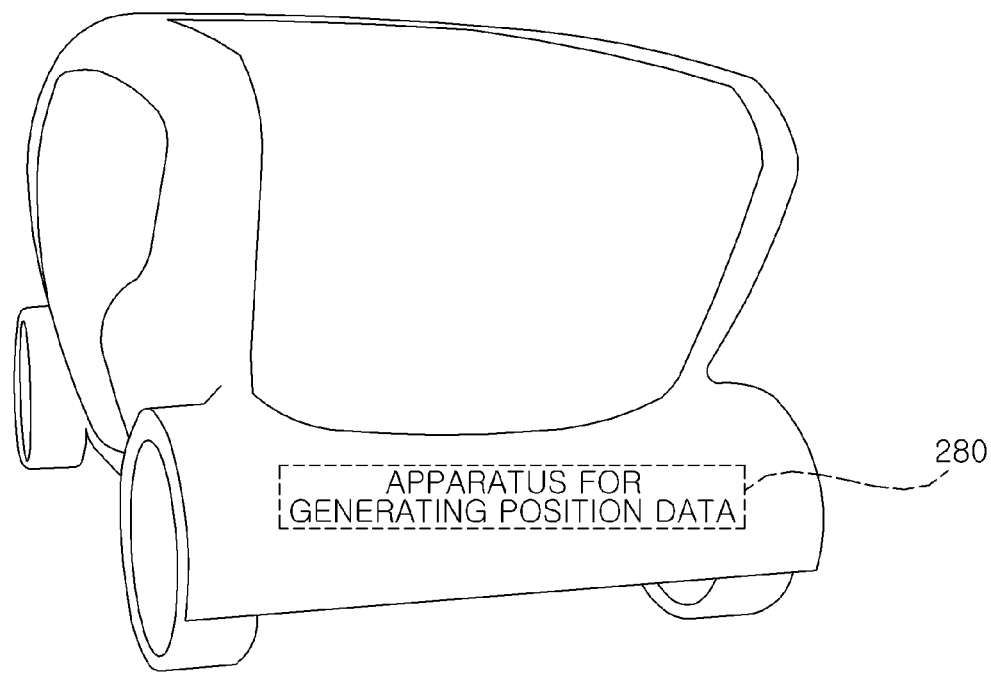
FIG. 1 is a view illustrating the external appearance of a vehicle in accordance with one embodiment of the present invention.
Figure 1:
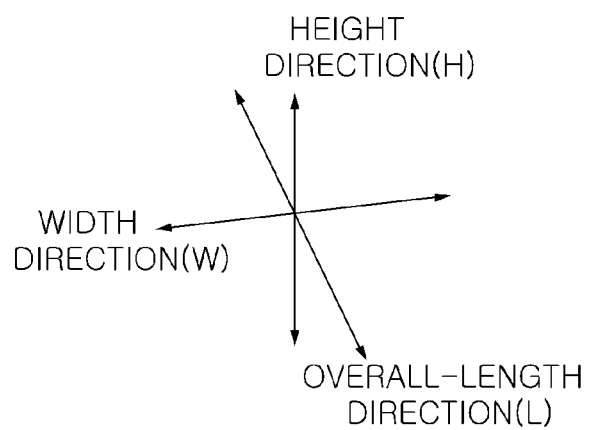

Hereinafter, embodiments of the present invention will be described in detail with reference to the accompanying drawings, and the same or similar elements are denoted by the same reference numerals even though they are depicted in different drawings, and the redundant description thereof will thus be omitted. In the following description of the embodiments, it will be understood that the suffixes "module" and "unit" added to elements are used in consideration only of ease in preparation of the description, and the terms themselves do not indicate important significances or roles. Therefore, the suffixes "module" and "unit" may be used interchangeably. In addition, in the following description of the present invention, a detailed description of known functions and configurations incorporated herein will be omitted when it may make the subject matter of the present invention rather unclear. While the invention will be described in conjunction with exemplary embodiments, it will be understood that the present description is not intended to limit the invention to the exemplary embodiments.

In addition, in the following description of the embodiments, the terms "first", "second", etc. may be used to describe various elements, and it will be understood that these terms do not limit the nature, sequence or order of the corresponding element. It will be understood that these terms are used only to distinguish one element from other elements.

In the following description of the embodiments, it will be understood that, when an element is "connected to", "coupled to", etc. another element, the two elements may be directly connected or coupled, or one or more other elements may be interposed between the two elements. On the other hand, it will be understood that, when an element is "directly connected to", "directly coupled to", etc. another element, no elements may be interposed between the two elements.

A singular expression of an element encompasses a plural expression of the element, unless stated otherwise.

In the following description of the embodiments, the terms "including", "having", etc. will be interpreted as indicating the presence of characteristics, numbers, steps, operations, elements or parts stated in the specification or combinations thereof, and do not exclude the presence of one or more characteristics, numbers, steps, operations, elements, parts or combinations thereof, or a possibility of adding the same.

FIG. 1 is a view illustrating the external appearance of a vehicle in accordance with one embodiment of the present invention.

Referring to FIG. 1, a vehicle 10 in accordance with one embodiment of the present invention is defined as a transportation means which runs on roads or railroads. The vehicle 10 conceptually includes an automobile, a train, and a motorcycle. The vehicle 10 may conceptually include an internal combustion vehicle provided with an engine as a power source, a hybrid vehicle provided with both an engine and an electric motor as power sources, an electric vehicle provided with an electric motor as a power sources, etc. The vehicle 10 may be a shared vehicle. The vehicle 10 may be an autonomous vehicle. The vehicle 10 may include an apparatus 280 for generating position data.

Further, the vehicle 10 may interact with at least one robot. The robot may be an autonomous mobile robot (AMR) which may autonomously travel by its own efforts. The mobile robot is autonomously movable and may thus freely move, and is provided with a plurality of sensors to avoid obstacles during traveling and may thus travel to avoid obstacle. The mobile robot may be a flying robot which has a flying apparatus (for example, a drone). The mobile robot may be a wheeled robot which has at least one wheel and is moved through rotation of the at least one wheel. The mobile robot may be a legged robot which has at least one leg and is moved using the at least one leg.

The robot may function as an apparatus which compensates for user convenience. For example, the robot may perform a function of moving baggage loaded into the vehicle 10 to a user's final destination. For example, the robot may perform a function of guiding a user getting out of the vehicle 10 to a final destination. For example, the robot may perform a function of transporting a user getting out of the vehicle 10 to a final destination.

At least one electronic apparatus included in the vehicle may perform communication with the robot through a communication device 220.

The at least one electronic apparatus included in the vehicle may provide data, processed by the at least one electronic apparatus included in the vehicle, to the robot. For example, the at least one electronic apparatus included in the vehicle may provide at least one of object data, HD map data, vehicle status data, vehicle position data or driving plan data to the robot.

The at least one electronic apparatus included in the vehicle may receive data, processed by the robot, from the robot. The at least one electronic apparatus included in the vehicle may receive at least one of sensing data, object data, robot status data, robot position data or robot moving plan data, generated by the robot.

The at least one electronic apparatus included in the vehicle may generate a control signal based further on data received from the robot. For example, the at least one electronic apparatus included in the vehicle may compare information about objects generated by an object detection device 210 to information about objects generated by the robot, and generate a control signal based on results of the comparison. The at least one electronic apparatus included in the vehicle may generate a control signal so as to avoid interference between a moving path of the vehicle 10 and a moving path of the robot.

The at least one electronic apparatus included in the vehicle may include a software module or a hardware module which realizes artificial intelligence (AI) (hereinafter, referred to as an artificial intelligence module). The at least one electronic apparatus included in the vehicle may input acquired data to the artificial intelligence module and use data output from the artificial intelligence module.

The artificial intelligence module may perform machine learning of the input data using at least one artificial neural network (ANN). The artificial intelligence module may output driving plan data through machine learning of the input data.

The at least one electronic apparatus may generate a control signal based on data output from the artificial intelligence module.

In accordance with embodiments, the at least one electronic apparatus included in the vehicle may receive data processed by artificial intelligence, from an external apparatus through the communication device 220. The at least one electronic apparatus included in the vehicle may generate a control signal based on the data processed by artificial intelligence.

Figure 2:
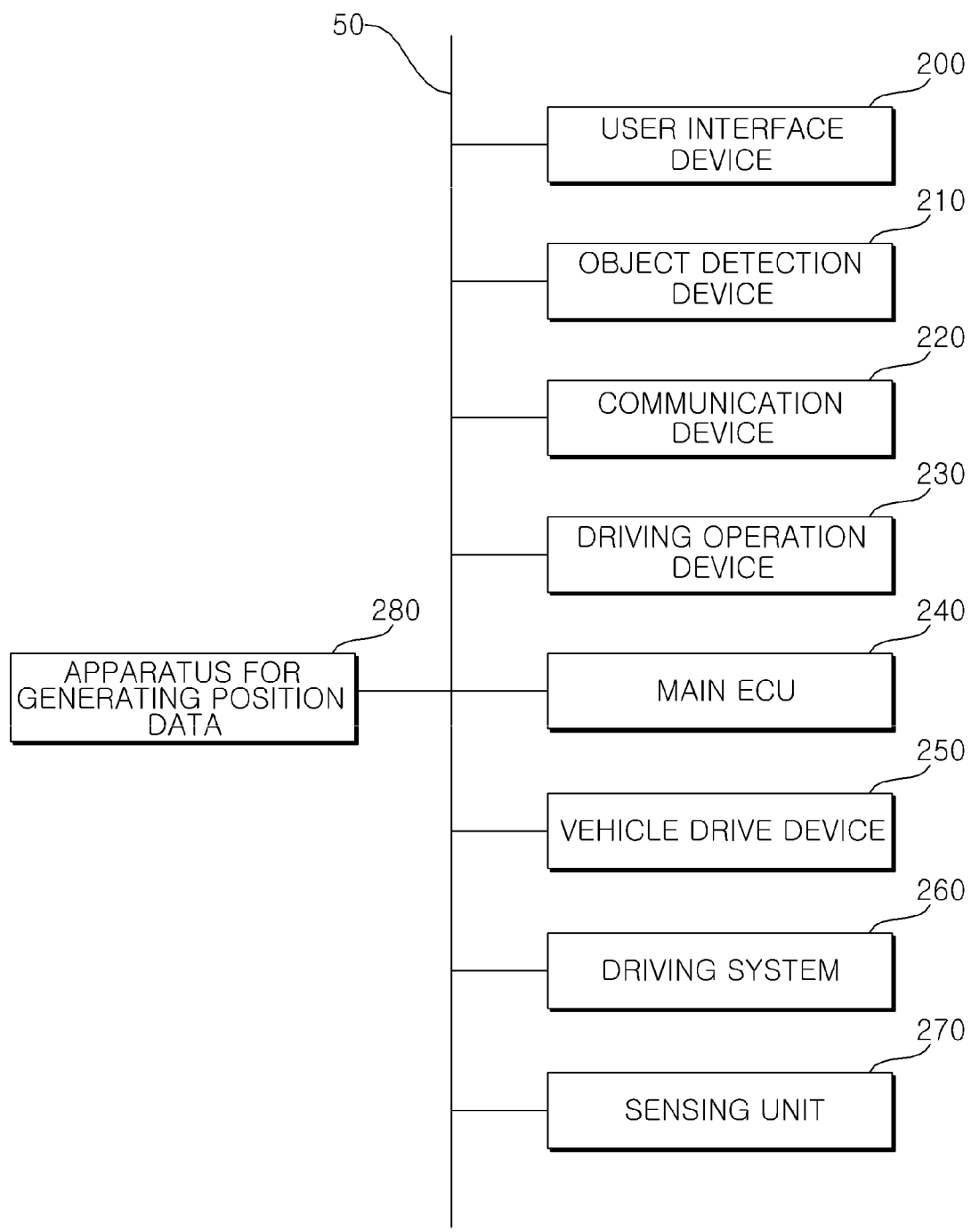
FIG. 2 is a control block diagram of the vehicle in accordance with one embodiment of the present invention.

FIG. 2 is a control block diagram of the vehicle in accordance with one embodiment of the present invention.

Referring to FIG. 2, the vehicle 10 may include a user interface device 200, the object detection device 210, the communication device 220, a driving operation device 230, a main ECU 240, a vehicle drive device 250, a driving system 260, a sensing unit 270 and the apparatus 280 for generating position data.

The user interface device 200 is an apparatus for communication between the vehicle 10 and a user. The user interface device 200 may receive user input and provide information generated by the vehicle 10 to the user. The vehicle 10 may implement a user interface (UI) or a user experience (UX) through the user interface device 200.

The object detection device 210 may detect objects outside the vehicle 10. The object detection device 210 may include at least one sensor which may detect objects outside the vehicle 10. The object detection device 210 may include at least one of a camera, a RADAR, a LIDAR, an ultrasonic sensor or an infrared sensor. The object detection device 210 may provide data about objects, generated based on a sensing signal generated by the at least one sensor, to the at least one electronic apparatus included in the vehicle.

The communication device 220 may exchange signals with a device located outside the vehicle 10. The communication device 220 may exchange signals with at least one of infrastructure (for example, a server and a broadcasting station) or other vehicles. The communication device 220 may include at least one of a transmission antenna, a reception antenna, and a radio-frequency (RF) circuit, which may implement various communication protocols, or an RF device.

The communication device 220 may communicate with the device located outside the vehicle 10 using 5G (for example, new radio (NR)) technology. The communication device 220 may implement V2X (V2V, V2D, V2P or V2N) communication using 5G technology.

The communication device 220 may provide information about the position of the vehicle 10, corrected by the apparatus 280 for generating position data, to other vehicles.

The driving operation device 230 is a device which receives user input for driving. In a manual mode, the vehicle 10 may be driven based on a signal provided by the driving operation device 230. The driving operation device 230 may include a steering input device (for example, a steering wheel), an acceleration input device (for example, an acceleration pedal), and a brake input device (for example, a brake pedal).

The main ECU 240 may control the overall operation of the at least one electronic apparatus included in the vehicle 10.

The drive control device 250 is a device which electrically controls various vehicle drive devices inside the vehicle 10. The drive control device 250 may include a powertrain drive control device, a chassis drive control device, a door/window drive control device, a safety device drive control device, a lamp drive control device and am air conditioner drive control device. The powertrain drive control device may include a power source drive control device and a transmission drive control device. The chassis drive control device may include a steering wheel drive control device, a brake drive control device and a suspension drive control device.

Further, the safety device drive control device may include a safety belt drive control device to control a safety belt.

The vehicle drive control device 250 may be referred to as a control electronic control unit (ECU).

The driving system 260 may control movement of the vehicle or generate a signal for outputting information to the user, based on data about objects received from the object detection device 210. The driving system 260 may provide the generated signal to at least one of the user interface device 200, the main ECU 240 or the vehicle drive device 250.

The driving system 260 may conceptually include an Advanced Driver Assistance System (ADAS). The ADAS 260 may implement at least one of an Adaptive Cruise Control (ACC) system, an Autonomous Emergency Braking (AEB) system, a Forward Collision Warning (FCW) system, a Lane-Keeping Assist (LKA) system, a Lane Change Assist (LCA) system, a Target Following Assist (TFA) system, a Blind-Spot Detection (BSD) system, an adaptive High-Beam Assist (HBA) system, an Auto Parking System (APS), a pedestrian (PD) collision warning system, a Traffic-Sign Recognition (TSR) system, a Traffic-Sign Assist (TSA) system, a Night Vision (NV) system, a Driver Status Monitoring (DSM) system, or a Traffic-Jam Assist (TJA) system.

The driving system 260 may include an autonomous driving Electronic Control Unit (ECU). The autonomous driving ECU may set an autonomous driving path based on data received from at least one of other electronic apparatuses inside the vehicle 10. The autonomous ECU may set the autonomous driving path based on data received from at least one of the user interface device 200, the object detection device 210, the communication device 220, the sensing unit 270 or the apparatus 280 for generating position data. The autonomous driving ECU may generate a control signal so that the vehicle 10 drives along the autonomous driving path. The control signal generated by the autonomous driving ECU may be provided to at least one of the main ECU 240 or the vehicle drive device 250.

The sensing unit 270 may sense a status of the vehicle. The sensing unit 270 may include at least one of an inertial navigation unit (IMU) sensor, a crash sensor, a speed sensor, a tilt sensor, a weight sensor, a heading sensor, a position module, a vehicle forward/backward driving sensor, a battery sensor, a fuel sensor, a tire sensor, a steering sensor for sensing rotation of a steering wheel, a vehicle indoor temperature sensor, a vehicle indoor humidity sensor, an ultrasonic sensor, an illumination sensor, an accelerator pedal position sensor or a brake pedal position sensor. The inertial navigation unit (IMU) sensor may include one or more of an acceleration sensor, a gyro sensor and a magnetic sensor.

The sensing unit 270 may generate status data of the vehicle based on a signal generated by the at least one sensor. The sensing unit 270 may acquire sensing signals to vehicle posture information, vehicle motion information, vehicle yaw information, vehicle roll information, vehicle pitch information, vehicle collision information, vehicle direction information, vehicle angle information, vehicle speed information, vehicle acceleration information, vehicle tilt information, vehicle forward/backward driving information, battery information, fuel information, tire information, vehicle lamp information, vehicle indoor temperature information, vehicle indoor humidity information, a steering wheel rotation angle, vehicle outdoor illumination, a pressure applied to an accelerator pedal, a pressure applied to a brake pedal, etc.

In addition, the sensing unit 270 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), etc.

The sensing unit 270 may generate vehicle status information based on the sensing data. The vehicle status information may be information generated based on data sensed by various sensors provided in the vehicle.

For example, the vehicle status information may include posture information of the vehicle, speed information of the vehicle, tilt information of the vehicle, weight information of the vehicle, direction information of the vehicle, battery information of the vehicle, fuel information of the vehicle, tire pressure information of the vehicle, steering information of the vehicle, vehicle indoor temperature information, vehicle indoor humidity information, pedal position information, vehicle engine temperature information, etc.

The sensing unit may include a tension sensor. The tension sensor may generate a sensing signal based on the tension state of a safety belt.

The apparatus 280 for generating position data may generate position data of the vehicle 10. The apparatus 280 for generating position data may include at least one of a Global Positioning System (GPS) or a Differential Global Positioning System (DGPS). The apparatus 280 for generating position data may generate the position data of the vehicle 10 based on a signal generated by at least one of the GPS or the DGPS. In accordance with embodiments, the apparatus 280 for generating position data may correct the position data based on at least one of an Inertial Measurement Unit (IMU) of the sensing unit 270 or a camera of the object detection device 210.

The apparatus 280 for generating position data may be referred to as a location positioning device. The apparatus 280 for generating position data may be referred to a Global Navigation Satellite System (GNSS).

The vehicle 10 may include an internal communication system 50. A plurality of electronic apparatuses included in the vehicle 10 may exchange signals via the internal communication system 50. The signals may include data. The internal communication system 50 may use at least one communication protocol (for example, CAN, LIN, FlexRay, MOST, and/or Ethernet).

Figure 3:
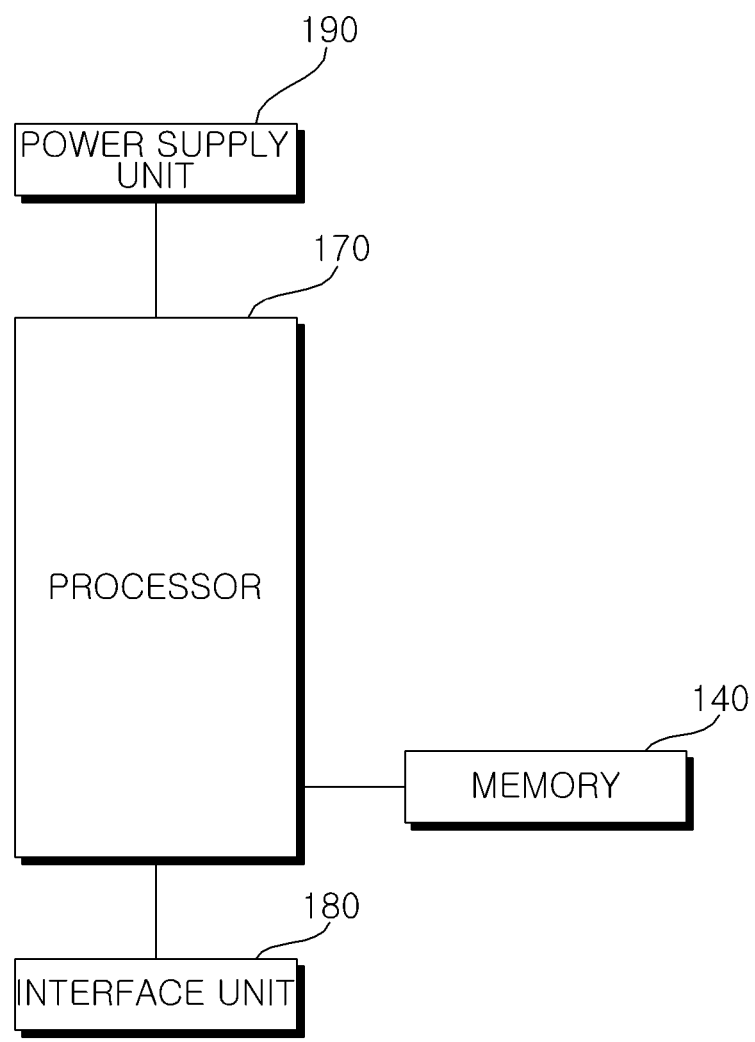
FIG. 3 is a control block diagram of an apparatus for generating position data in accordance with one embodiment of the present invention.

FIG. 3 is a control block diagram of an electronic apparatus in accordance with one embodiment of the present invention.

Referring to FIG. 3, the apparatus 280 for generating position data may include a memory 140, a processor 170, an interface unit 180 and a power supply unit 190.

The memory 140 is electrically connected to the processor 170. The memory 140 may store primary data for units, control data for controlling operations of the units, and input and output data. The memory 140 may store data processed by the processor 170. The memory 140 may include at least one of a ROM, a RAM, an EPROM, a flash drive or a hard drive, from the aspect of hardware. The memory 140 may store various pieces of data for overall operation of the electronic apparatus 100, including programs to perform processing and control through the processor 170. The memory 140 may be implemented integrally with the processor 140. In accordance with embodiments, the memory 140 may be classified as a sub-element of the processor 170.

The interface unit 180 may exchange signals with the at least one electronic apparatus provided in the vehicle 10 by wires or wirelessly. The interface unit 180 may exchange signals with at least one of the user interface device 200, the object detection device 210, the communication device 220, the driving operation device 230, the main ECU 240, the vehicle drive device 250, the driving system 260 or the sensing unit 270 by wires or wirelessly. The interface unit 280 may include at least one of a communication module, a terminal, a pin, a cable, a port, a circuit, an element or a device.

The power supply unit 190 may supply power to the electronic apparatus 100. The power supply unit 190 may receive power from a power source (for example, the battery) included in the vehicle 10, and supply the power to the respective units of the electronic apparatus 100. The power supply unit 190 may be operated by a control signal provided by the main ECU 140. The power supply unit 190 may be implemented as a switched-mode power supply (SMPS).

The processor 170 may be electrically connected to the memory 140, the interface unit 180 and the power supply unit 190 and thus exchange signals with the same. The processor 170 may be implemented using at least one of application-specific integrated circuits (ASICs), digital signal processors (DSPs), digital signal processing devices (DSPDs), programmable logic devices (PLDs), field-programmable gate arrays (FPGAs), processors, controllers, micro-controllers, microprocessors, or electric units for performing other functions.

The processor 170 may be driven by power supplied from the power supply unit 190. The processor 170 may receive data, process the data, generate a signal and provide the signal, under the condition that power is supplied from the power supply unit 190 to the processor 170.

The processor 170 may receive information from other electronic apparatuses inside the vehicle 10 through the interface unit 180. The processor 170 may provide control signals to other electronic apparatuses inside the vehicle 10 through the interface unit 180.

The processor 170 may generate position data of the vehicle 10. The processor 170 may provide information about the position of the vehicle 10. The processor 170 may provide the information about the position of the vehicle 10 to external apparatuses (for example, a server, other vehicles, a user terminal, etc.) through the communication device 220.

The processor 170 may acquire position information of an antenna installed in the vehicle 10. Here, the antenna may be an antenna of a GPS or a DGPS. The processor 170 may generate the position data of the vehicle 10 based on the position information of the antenna. Here, the position data allows the external apparatus to recognize the position of the vehicle 10 through V2X communication. The processor 170 may acquire reference point information in movement control of the vehicle 10. For example, a reference point may be a point which becomes the center of each of the overall length, the overall width and the overall length of the vehicle 10. The processor 170 may generate the position data of the vehicle 10 based on the reference point information. The processor 170 may determine the position of the vehicle and generate the position data of the vehicle by reflecting a distance between the position of the antenna and the reference point in the position of the antenna. The distance between the position of the antenna and the reference point may be defined as an offset. The processor 170 may determine the position of the vehicle 10 by reflecting the offset in the position of the antenna. Offsets may be divided into a first offset in an overall length direction, a second offset in an overall width direction, and a third offset in an overall height direction.

The processor 170 may acquire information about change in the external appearance of the vehicle 10. The change in the external appearance of the vehicle 10 may mean change in the volume of the vehicle 10. For example, if at least one of doors of the vehicle 10 is opened, baggage is loaded into the vehicle 10, or a trailer is connected to the vehicle 10, it may be understood that the external appearance of the vehicle 10 is changed.

The processor 170 may acquire information about change in the external appearance of the vehicle 10 from a camera, which photographs at least a part of the vehicle 10. Here, the camera may be at least one of a camera installed in the vehicle 10, a camera installed in a structure around a road, or cameras installed in other vehicles. For example, the processor 170 may receive image data from a camera installed in the vehicle 10 through the interface unit 180, and acquire information about change in the external appearance of the vehicle 10 based on the received image data. For example, the processor 170 may receive image data from a camera installed in a structure around a road through the communication unit 220 and the interface unit 180, and acquire information about change in the external appearance of the vehicle 10 based on the received image data. For example, the processor 170 may receive image data from a camera installed in another vehicle through the communication unit 220 and the interface unit 180, and acquire information about change in the external appearance of the vehicle 10 based on the received image data.

The processor 170 may receive a signal generated based on user input in response to the change in the external appearance of the vehicle 10. The processor 170 may receive a signal converted from user input in response to the change in the external appearance of the vehicle 10, from the user interface device 200 through the interface unit 180. The processor 170 may acquire information about the change in the external appearance of the vehicle 10 based on the received signal.

The processor 170 may correct the position data based on the information about the change in the external appearance of the vehicle 10. In accordance with embodiments, correction of the position data based on the information about the change in the external appearance of the vehicle 10 may be carried out only when it is determined that the vehicle 10 is in a stopped state.

The processor 170 may acquire information about opening of at least one of the doors of the vehicle 10. The processor 170 may acquire the information about opening of at least one of the doors of the vehicle 10 through the above-described camera. The processor 170 may acquire the information about opening of at least one of the doors based on a signal received from the door sensor included in the sensing unit 270.

The processor 170 may correct the position data of the vehicle 10 based on the information about opening of at least one door. The processor 170 may correct the position data of the vehicle 10 by adding half of a value of the width of the vehicle 10, increased due to opening of the at least one door, as an offset between the position of the antenna and the center of the overall width of the vehicle 10.

The processor 170 may acquire information about a person getting into the vehicle 10 or getting out of the vehicle 10. The processor 170 may acquire the information about the person getting into or out of the vehicle through the above-described camera. The processor 170 may acquire the information about the person getting into or out of the vehicle based on a position signal received from a terminal possessed by a user. Further, in accordance with embodiments, the information about the person getting into the vehicle 10 or out of the vehicle 10 may be understood as a subordinate concept of the information about the change in the external appearance of the vehicle 10.

The processor 170 may correct the position data of the vehicle 10 based on the information about the person getting into or out of the vehicle. The processor 170 may correct the position data of the vehicle 10 by adding half of a value of the width of a road on which the person is located, as an offset between the position of the antenna and the center of the overall width of the vehicle 10.

The electronic apparatus 100 may include at least one printed circuit board (PCB). The memory 140, the interface unit 180, the power supply unit 190 and the processor 170 may be electrically connected to the printed circuit board.

Figure 4:
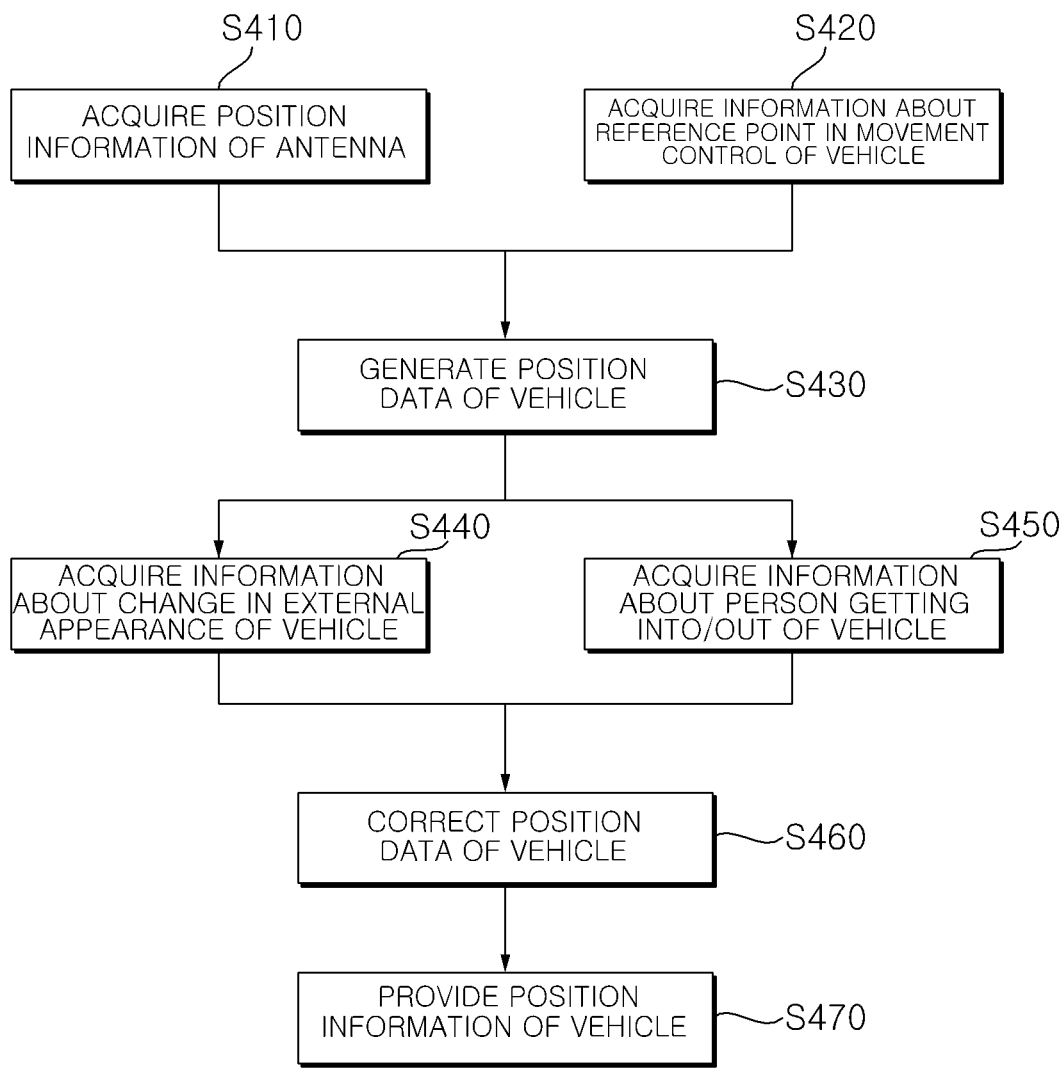
FIG. 4 is a flowchart of the apparatus for generating position data in accordance with one embodiment of the present invention.

FIG. 4 is a flowchart of the apparatus for generating position data in accordance with one embodiment of the present invention.

Referring to FIG. 4, the processor 170 may acquire position information of the antenna installed in the vehicle (operation S410). The processor 170 may acquire reference point information in movement control of the vehicle (operation S420).

The processor 170 may generate position data of the vehicle 10 based on the position information of the antenna (operation S430). The processor 170 may generate position data of the vehicle 10 based further on the reference point information.

The processor 170 may acquire information about change in the external appearance of the vehicle 10 (operation S440). The acquisition of the information about the change in the external appearance of the vehicle 10 (operation S440) may include acquiring, by at least one processor 170, the information about the change in the external appearance of the vehicle 10 from the camera, which photographs at least a part of the external appearance of the vehicle 10. The acquisition of the information about the change in the external appearance of the vehicle 10 (operation S440) may include acquiring, by the at least one processor 170, information about opening of at least one of the doors of the vehicle 10.

The acquisition of the information about the change in the external appearance of the vehicle 10 (operation S440) may include receiving, by the at least one processor 170, a signal generated based on user input in response to the change in the external appearance of the vehicle 10, and acquiring, by the at least one processor 170, the information about the change in the external appearance of the vehicle 10 based on the signal.

The processor 170 may acquire information about a person getting into the vehicle 10 or out of the vehicle 10 (operation S450). In accordance with embodiments, the information about the person getting into the vehicle 10 or out of the vehicle 10 may be understood as a subordinate concept of the information about the change in the external appearance of the vehicle 10.

The processor 10 may correct the position data of the vehicle 10 based on the information about the change in the external appearance of the vehicle 10 (operation S460).

The correction of the position data of the vehicle 10 (operation S460) may include correcting the position data of the vehicle 10 based on the information about opening of the at least one of the doors of the vehicle 10. The correction of the position data of the vehicle based on the information about opening may include correcting, by the at least one processor 170, the position data of the vehicle 10 by adding half of a value of the width of the vehicle 10, increased due to opening of the at least one door, as an offset between the position of the antenna and the center of the overall width of the vehicle 10.

The correction of the position data of the vehicle 10 (operation S460) may include correcting, by at least one processor 170, the position data of the vehicle 10 based further on the information about the person. The correction of the position data of the vehicle 10 based further on the information about the person may include correcting, by the at least one processor 170, the position data of the vehicle 10 by adding half of a value of the width of a road on which the person is located, as an offset between the position of the antenna and the center of the overall width of the vehicle 10.

The processor 170 may provide information about the position of the vehicle 10 (operation S470). The processor 170 may provide the information about the position of the vehicle 10 to the communication device 220 through the interface unit 180. The communication device 20 may convert the information about the position of the vehicle 10 into a communicable data format, and transmit the information in the communicable data format to external apparatuses (a server, other vehicles and a user terminal).

Figure 5:
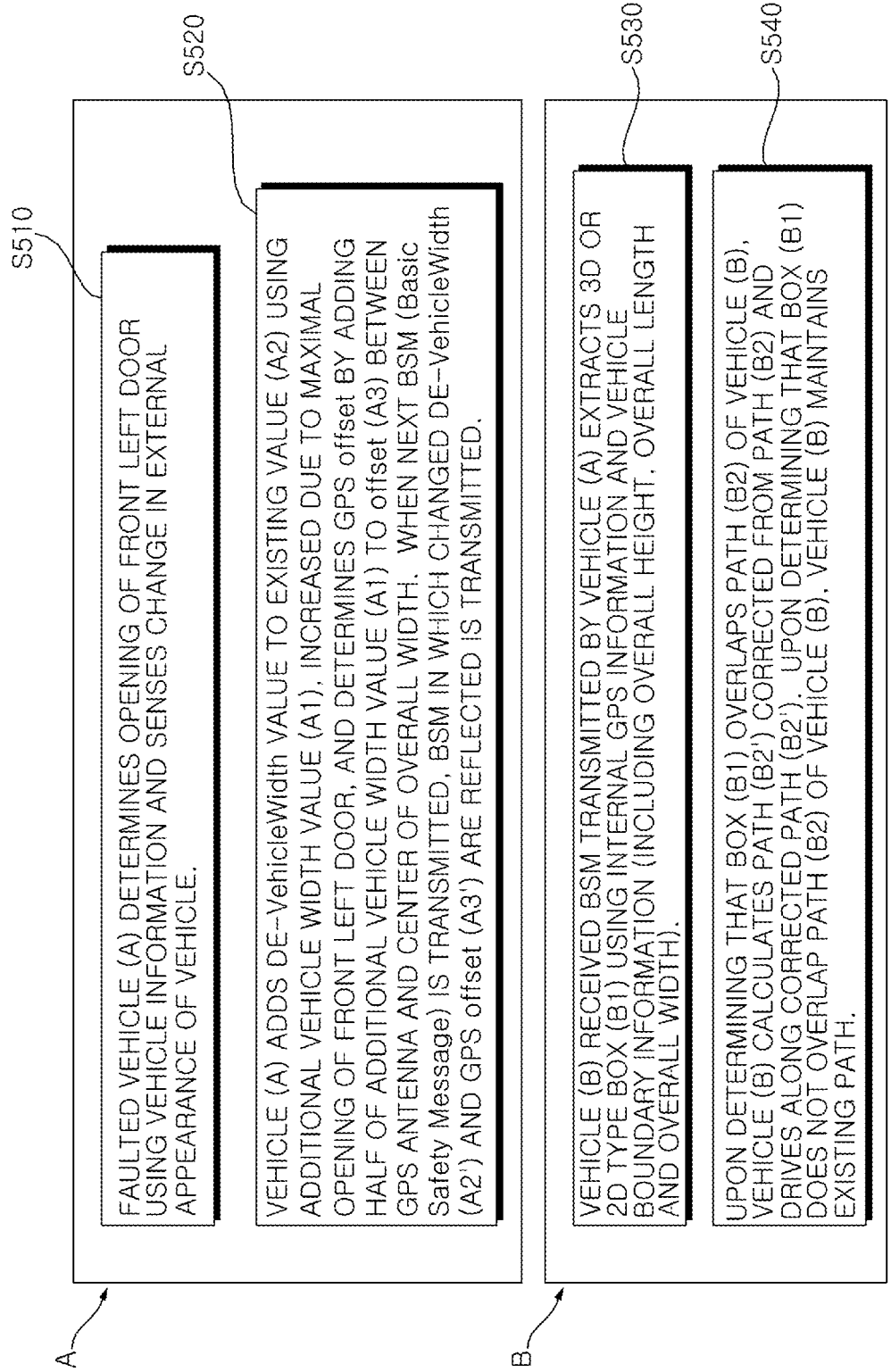
FIGS. 5 to 7 are reference views illustrating the operation of a system in accordance with one embodiment of the present invention.
Figure 6:
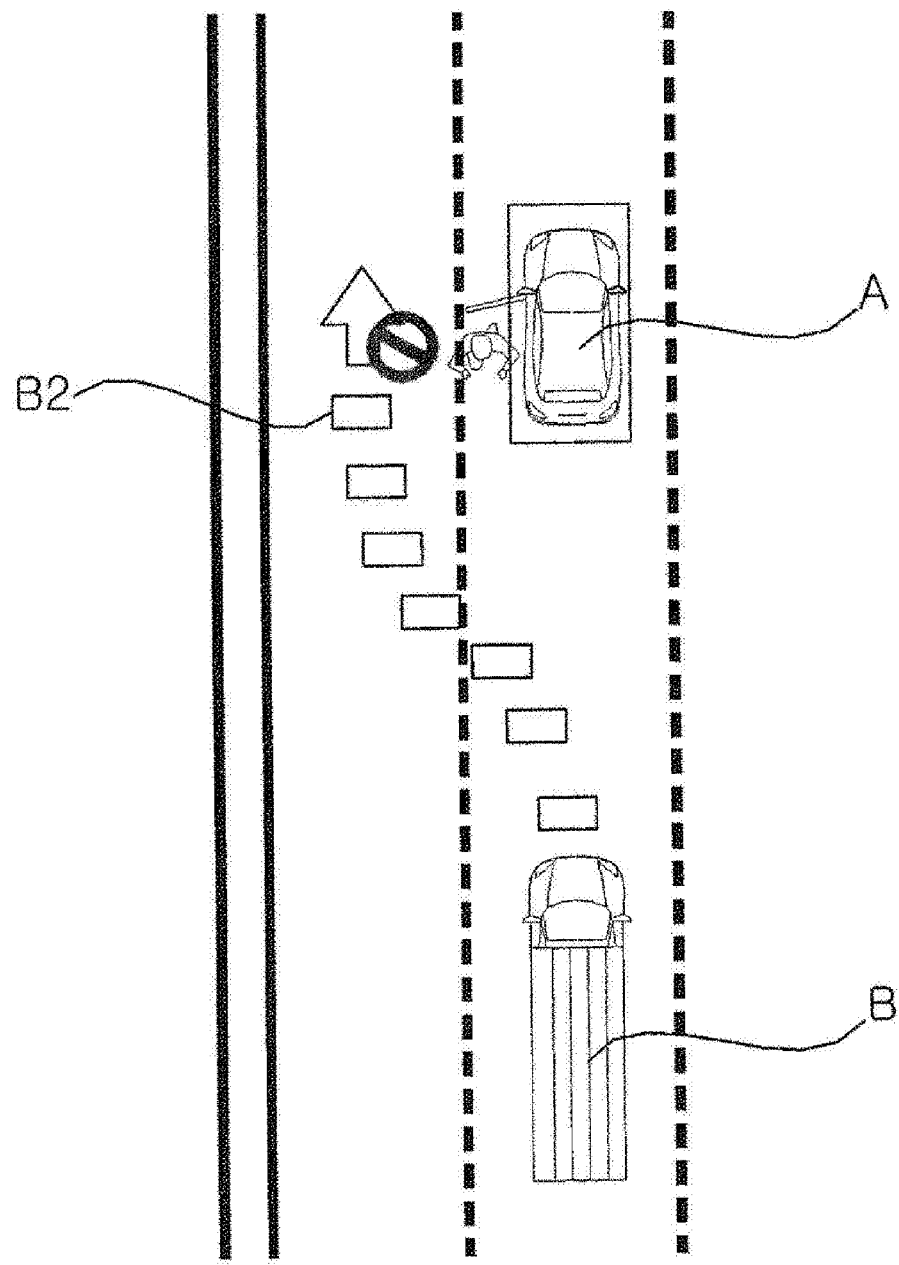
Figure 7:
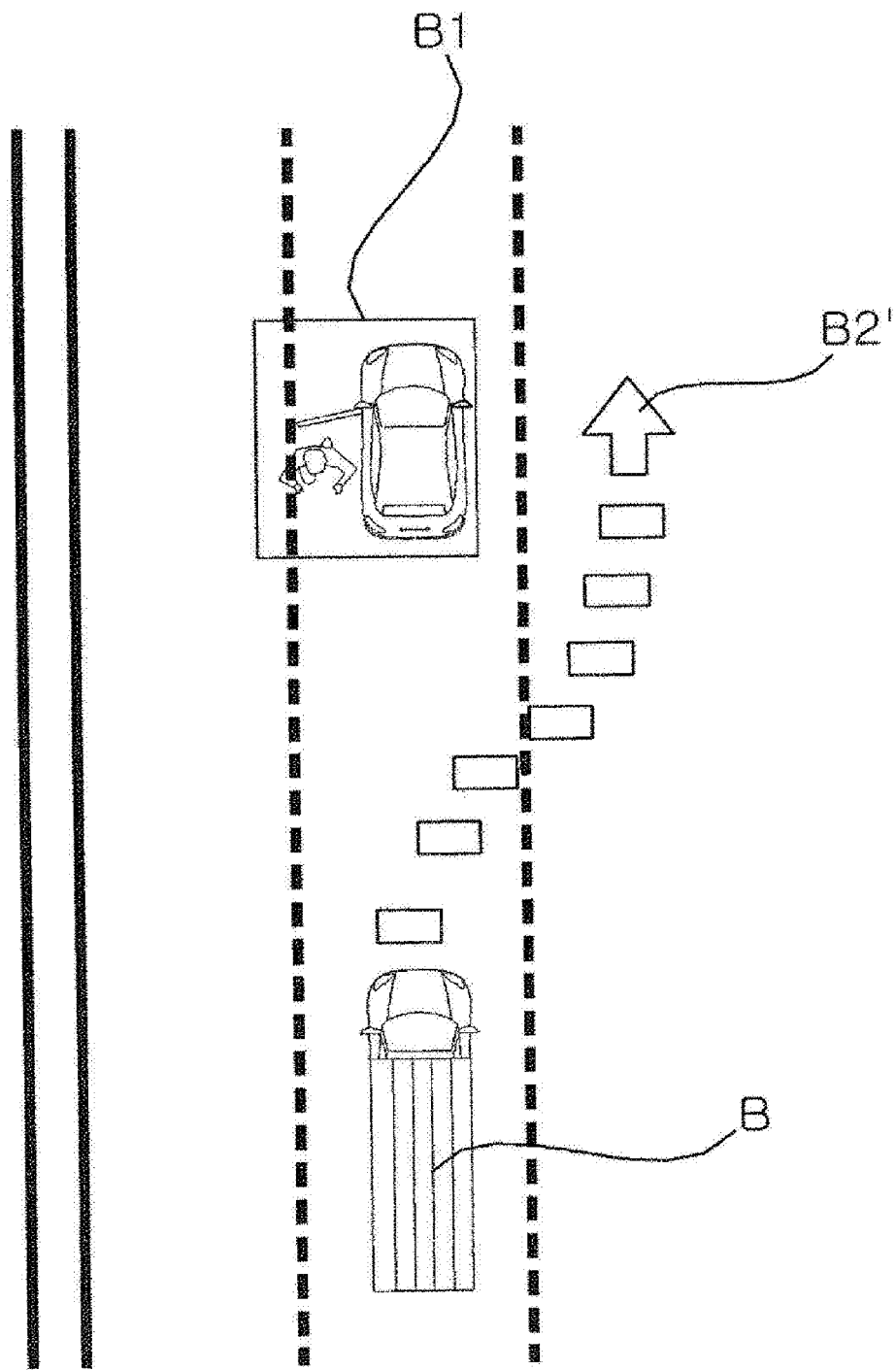

FIGS. 5 to 7 are reference views illustrating the operation of a system in accordance with one embodiment of the present invention.

Referring to these figures, it may be described that operation S510 and operation S520 are performed by a first vehicle A, and operation S530 and operation S540 are performed by a second vehicle B. The first vehicle A may be the above-described vehicle 10 including the apparatus 280 for generating position data, and the second vehicle B may be the above-described other vehicle.

The processor 170 may acquire information about opening of at least one of doors of the first vehicle A. The processor 170 may acquire information about change in the external appearance of the first vehicle A based on the information about opening (operation S510).

The processor 170 may correct position data of the first vehicle A based on the information about the change in the external appearance of the first vehicle A. In more detail, the processor 170 may add a width value of the vehicle A, which is added due to opening of the at least one of the doors, to a basic overall width value of the vehicle A. In this case, an entire overall width value of the first vehicle A may be generated by adding an additional length due to opening of the at least one of the doors to the basic overall width value of the vehicle A. The processor 170 may determine an entire offset by adding half of the additional length due to opening of the at least one of the doors to a basic offset between the antenna and the basic overall width. When a Basic Safety Message (BSM) is transmitted, the communication device 220 may transmit the BSM in a state in which the entire overall width value and the entire offset of the first vehicle A are reflected (Operation S520). Here, the basic overall width value may mean the overall width value of the first vehicle A in a state in which all of the doors are closed. The basic offset may be described as an offset in the state in which all of the doors of the first vehicle are closed.

The second vehicle B may receive the BSM transmitted by the first vehicle A. The second vehicle B may extract a 3D or 2D type box B1 using GPS information and boundary information (overall height, overall length and overall width) of the first vehicle A (operation S530). Upon determining that the extracted box B1 overlaps a path B2 of the second vehicle B, the second vehicle B may generate a corrected path B2' and thus drive along the corrected path B2'. Upon determining that the extracted box B1 does not overlap the path B2 of the second vehicle B, the second vehicle B may maintain the existing path B2.

Figure 8:
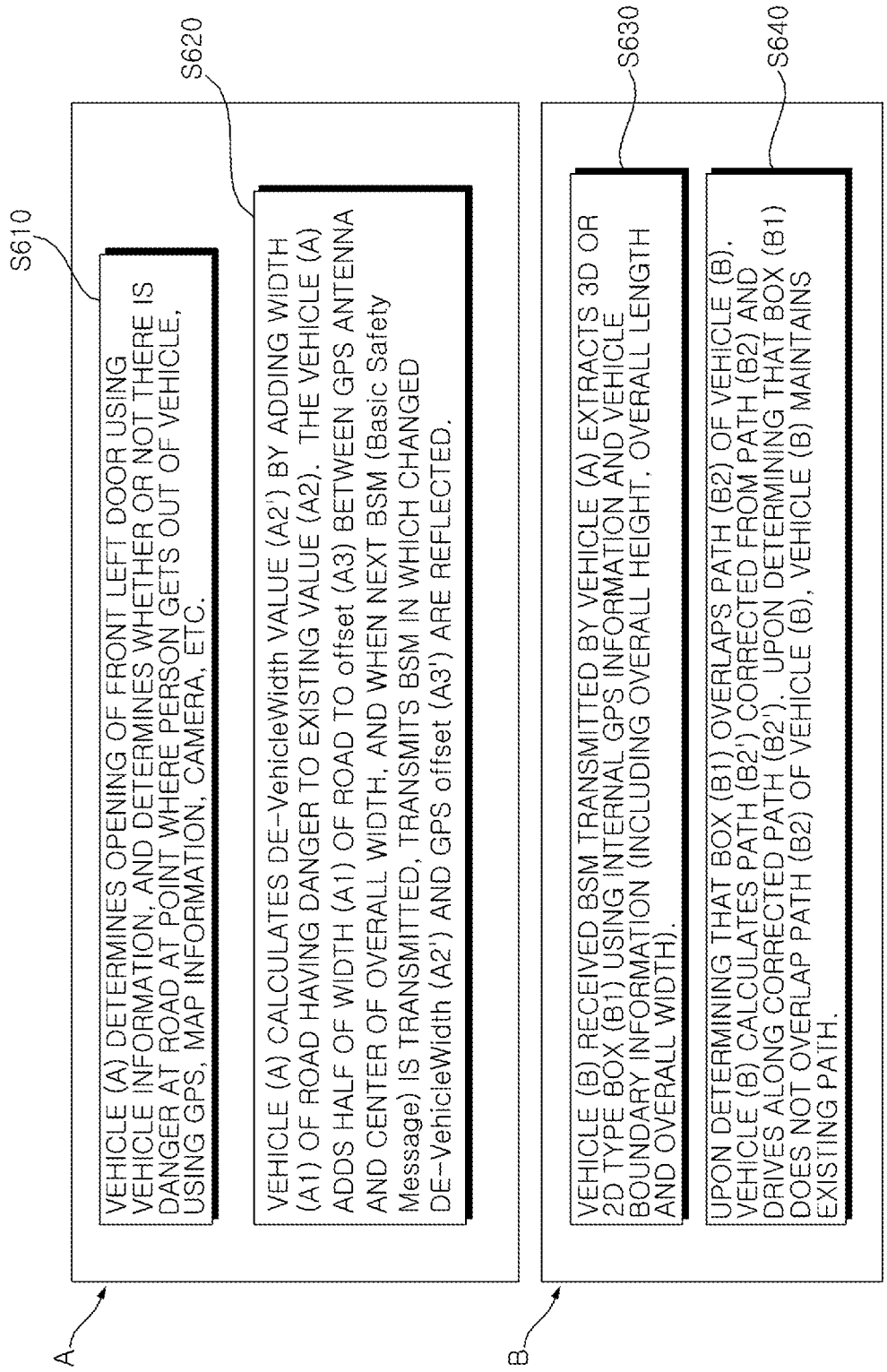
FIGS. 8 to 10 are reference views illustrating the operation of a system in accordance with another embodiment of the present invention.
Figure 9:
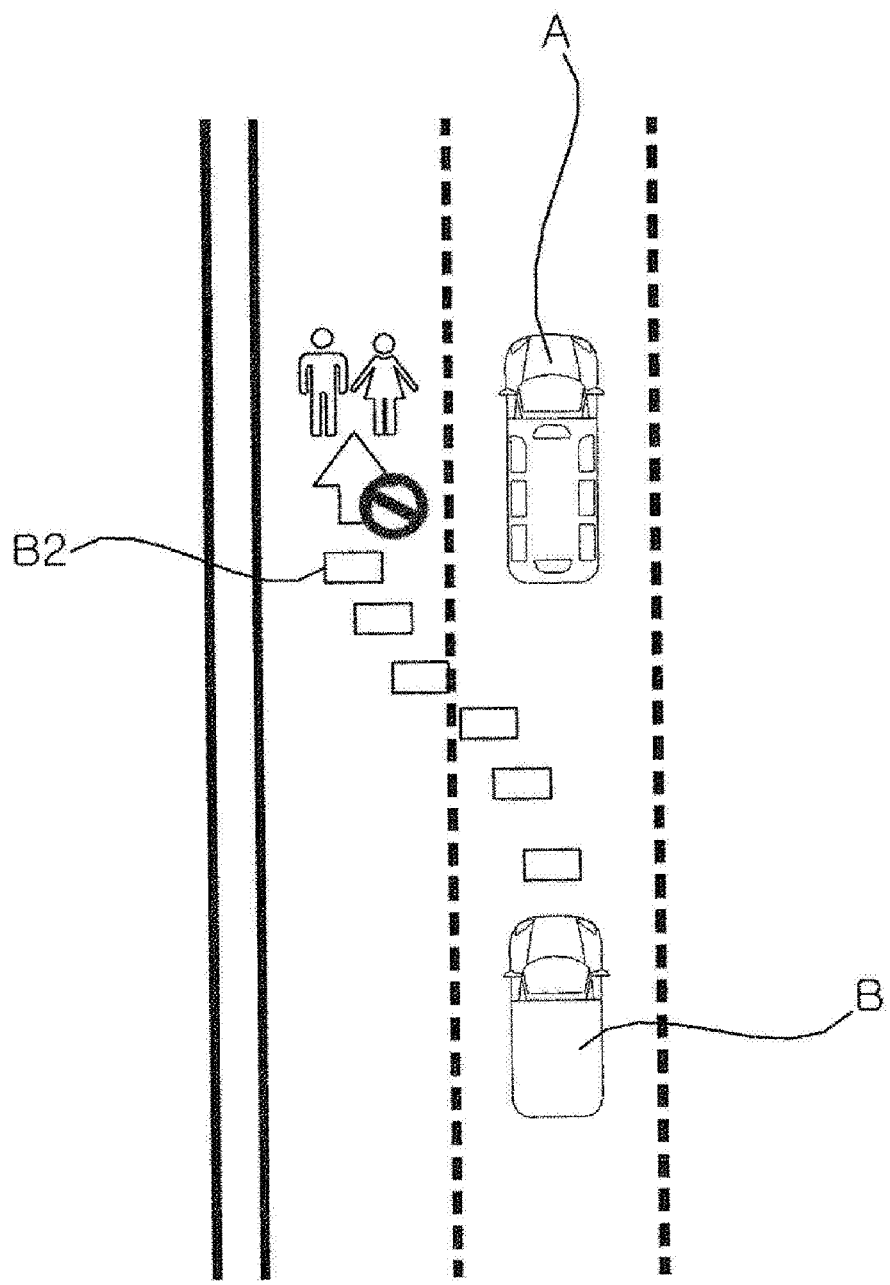
Figure 10:
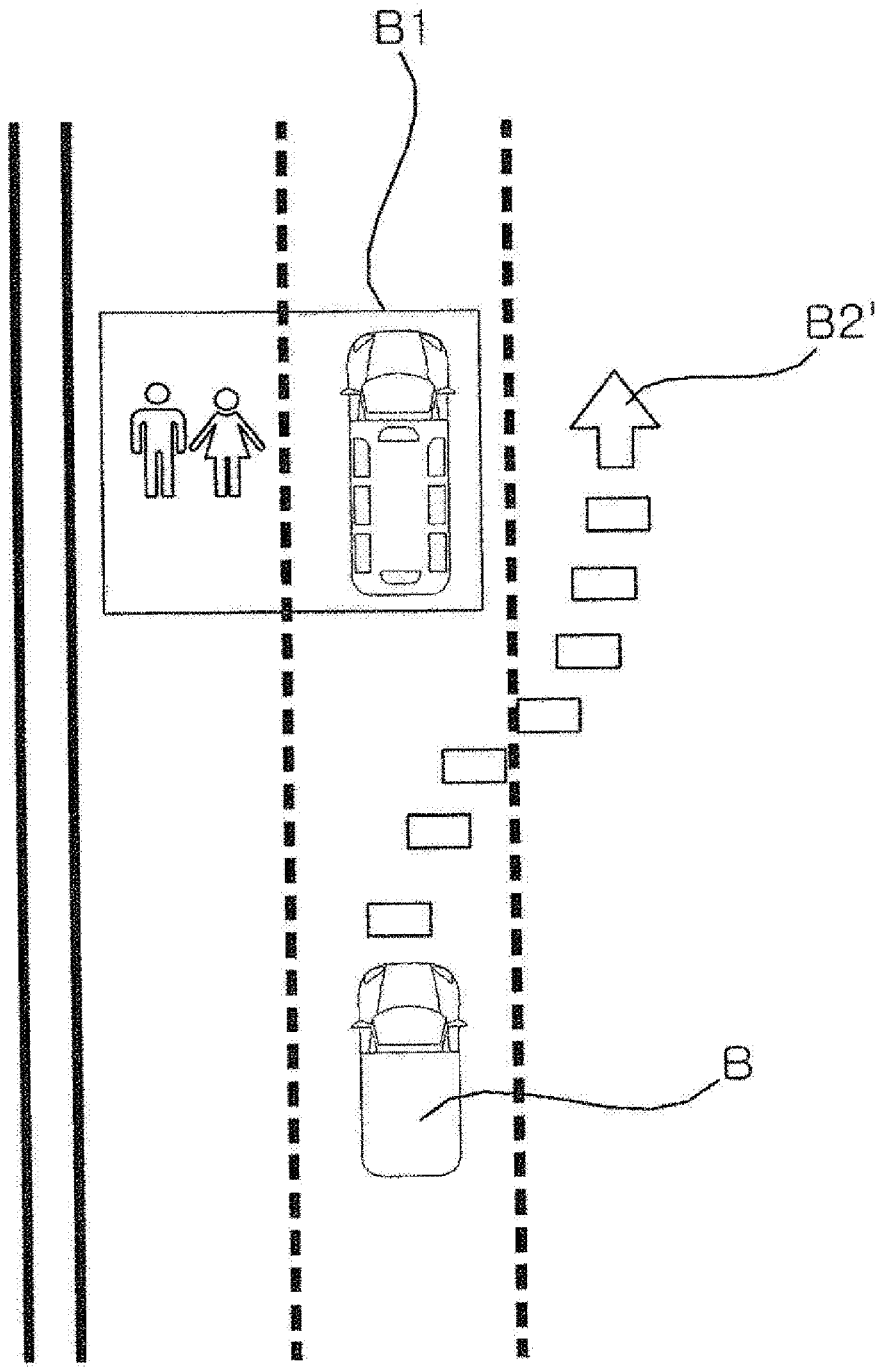

FIGS. 8 to 10 are reference views illustrating the operation of a system in accordance with another embodiment of the present invention.

Referring to these figures, it may be described that operation S610 and operation S620 are performed by a first vehicle A, and operation S630 and operation S640 are performed by a second vehicle B. The first vehicle A may be the above-described vehicle 10 including the apparatus 280 for generating position data, and the second vehicle B may be the above-described other vehicle.

The processor 170 may acquire information about opening of at least one of doors of the first vehicle A. The processor 170 may acquire information about a person getting into the vehicle 10 or getting out of the vehicle 10. The processor 170 may determine whether or not there is danger at a road at a point where the person gets out of the vehicle, using a GPS, map information, a camera, etc. (operation S610).

The processor 170 may correct position data of the first vehicle A based on the information about the change in the external appearance of the first vehicle A and the information about the person getting into the vehicle or getting out of the vehicle 10. In more detail, the processor 170 may add a width value of a road on which the person is located to a basic overall width value of the vehicle A. In this case, an entire overall width value of the first vehicle A may be generated by adding the width value of the road on which the person is located, to the basic overall width value of the vehicle A. The processor 170 may determine an entire offset by adding half of the width value of the road, added due to the person getting into/out of the vehicle, to a basic offset between the antenna and the basic overall width. When a BSM is transmitted, the communication device 220 may transmit the BSM in a state in which the entire overall width value and the entire offset of the first vehicle 10 are reflected (Operation S620). Here, the basic overall width value may mean the overall width value of the first vehicle A in a state in which all of the doors are closed. The basic offset may be described as an offset in the state in which all of the doors of the first vehicle are closed.

The second vehicle V2 may receive the BSM transmitted by the first vehicle A. The second vehicle B may extract a 3D or 2D type box B1 using GPS information and boundary information (overall height, overall length and overall width) of the first vehicle A (operation S630). Upon determining that the extracted box B1 overlaps a path B2 of the second vehicle B, the second vehicle B may generate a corrected path B2' and thus drive along the corrected path B2'. Upon determining that the extracted box B1 does not overlap the path B2 of the second vehicle B, the second vehicle B may maintain the existing path B2.

Figure 11:
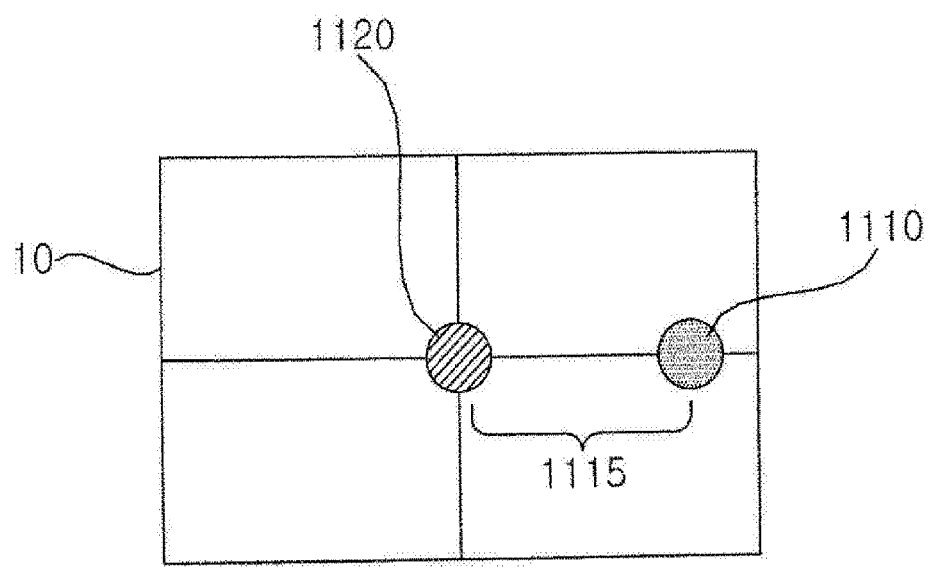
FIGS. 11 and 12 are reference views illustrating position data correction operations in accordance with embodiments of the present invention.
Figure 12:
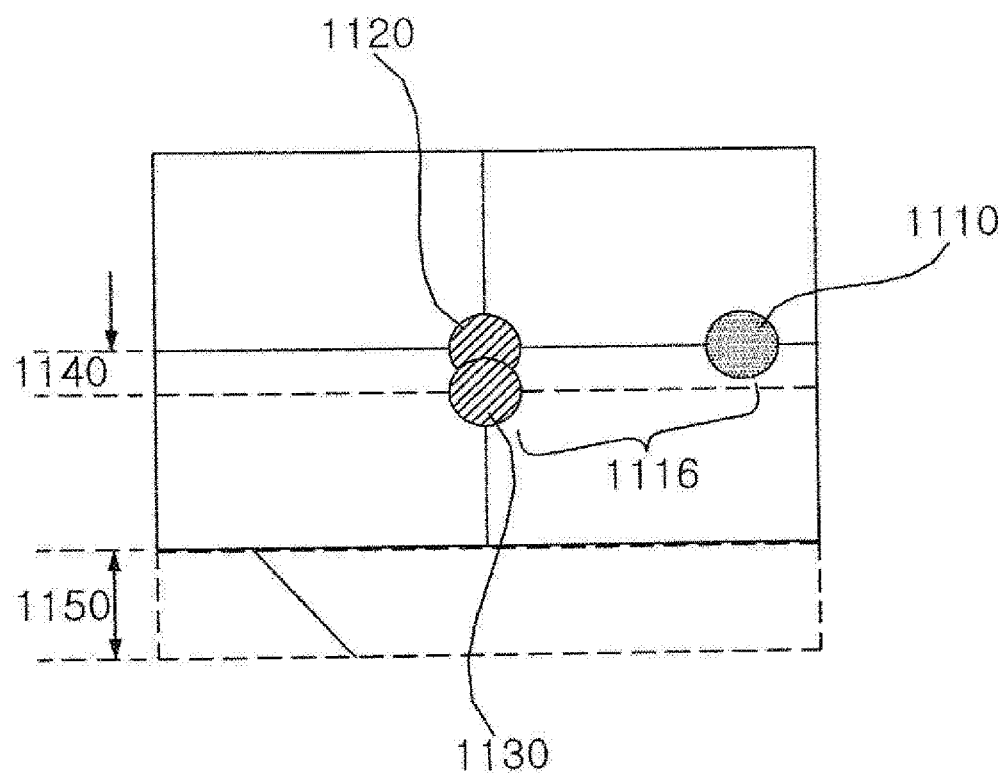

FIGS. 11 and 12 are reference views illustrating position data correction operations in accordance with embodiments of the present invention.

Referring to FIG. 11, the processor 170 may acquire information about a position 1110 of an antenna installed in the vehicle 10. Here, the antenna may be an antenna of a GPS or a DGPS. The antenna is installed at the time of manufacture of the vehicle, and may thus have a default position value. The information about the position 1110 of the antenna may be information numerically indicating a region of the vehicle 10, in which the antenna is installed, based on a specific point of the vehicle 10. The processor 170 may generate position data of the vehicle 10 based on the position information of the antenna.

The processor 170 may acquire information about a reference point 1120 in movement control of the vehicle 10. The reference point in movement control of the vehicle 10 may have a value set as a default. For example, the reference point may be described as a point at which a central line of the overall length, a central line of the overall width, and a central line of the overall height of the vehicle 10 intersect. For example, the reference point may be described as a central point of a hexahedron circumscribed about the vehicle 10.

The processor 170 may determine a position of the vehicle by reflecting an offset in the position 1110 of the antenna. Here, the offset may be described as a distance value 1115 between the position 1110 of the antenna and the reference point 1120. The processor 170 may determine the position of the vehicle by reflecting the distance 1115 between the position 1110 of the antenna and the reference point 1120.

The communication device 220 may transmit a BSM, in which information about the position of the vehicle and information about the overall length, overall width and overall height of the vehicle 10 are included, to an external apparatus.

Referring to FIG. 12, the processor 170 may acquire information about a position 1110 of an antenna installed in the vehicle 10. The processor 170 may generate position data of the vehicle 10 based on the position information of the antenna.

The processor 170 may acquire information about change in the external appearance of the vehicle 10. For example, the processor 170 may acquire information about change in the external appearance of the vehicle 10 due to opening of one of the doors of the vehicle 10. The processor 170 may acquire information about change in the external appearance of the vehicle 10 due to a person getting into and out of the vehicle 10. In this case, it may be understood that the external appearance of the vehicle 10 conceptually includes the person.

The processor 170 may correct the position data of the vehicle 10 based on the information about the change in the external appearance of the vehicle 10. The processor 170 may add a width value 1150 of the vehicle, which is to be added due to opening of the door, to a basic overall width value of the vehicle. An entire overall width value may be generated by adding the width value 1150, which is added due to opening of the door, to the basic overall width value.

The processor 170 may determine a position of the vehicle by reflecting an offset in the position 1110 of the antenna. Here, the offset may be described as a value in which half 1140 of the width value 1150 of the vehicle, which is added due to opening of the door, is reflected in a distance value between the position 1110 of the antenna and the reference point 1120. The processor 170 may determine the position of the vehicle by reflecting the half 1140 of the width value 1150 of the vehicle, which is added due to opening of the door, in the distance between the position 1110 of the antenna and the reference point 1120.

The above-described present invention may be implemented as computer readable code in a computer readable recording medium in which programs are recorded. Computer readable recording media may include all kinds of recording media in which data readable by computers is stored. The computer readable recording media may include a Hard Disk Drive (HDD), a Solid State Disk (SSD), a Silicon Disk Drive (SDD), a ROM, a RAM, a CD-ROM, a magnetic tape, a floppy disk, and an optical data storage device, and may be implemented as a carrier wave (for example, transmission over the Internet). Moreover, the computer may include a processor or a controller. The above description has been made only for a better understanding of the present invention and is not interpreted restrictively. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An apparatus for generating position data comprising:
an interface configured to exchange signals; and
a processor that is connected to the interface and that is configured to:
acquire position information of an antenna installed in a vehicle through the interface and generate position data indicating a location of the vehicle based on the position information of the antenna; and
acquire information about change in an external appearance of the vehicle and correct the position data of the vehicle based on the information about the change in the external appearance of the vehicle,
wherein the processor is configured to:
acquire information about a reference point in movement control of the vehicle through the interface and generate the position data of the vehicle based on the information about the reference point,
acquire information about opening of at least one door of the vehicle through the interface, and
correct the position data of the vehicle by adding half of a value of a width of the vehicle, increased due to the opening of the at least one door, as a first offset between a position of the antenna and a center of the width of the vehicle.

2. The apparatus according to claim 1, wherein the processor is configured to acquire the information about the change in the external appearance of the vehicle from a camera configured to photograph at least a part of the external appearance of the vehicle.

3. The apparatus according to claim 1, wherein the processor is configured to acquire information about a person getting into the vehicle or getting out of the vehicle, and correct the position data of the vehicle based further on the information about the person.

4. The apparatus according to claim 3, wherein the processor is configured to correct the position data of the vehicle by adding half of a value of a width of a road on which the person is located, as a second offset between the position of the antenna and the center of the width of the vehicle.

5. The apparatus according to claim 1, wherein the processor is configured to:
receive, through the interface, a signal generated based on user input in response to the change in the external appearance of the vehicle; and
acquire the information about the change in the external appearance of the vehicle based on the signal.

6. The apparatus according to claim 1, wherein the processor is configured to:
receive, through the interface, image data in which the vehicle is photographed, from another vehicle; and
acquire the information about the change in the external appearance of the vehicle based on the image data.

7. An autonomous vehicle comprising:
the apparatus for generating position data according to claim 1; and
a communication device configured to provide information about a corrected position of the vehicle to another vehicle,
wherein the communication device includes at least one of a transmission antenna, a reception antenna, or a radio-frequency circuit.

8. A method for generating position data by an apparatus including an interface and at least one processor, the method comprising:
acquiring, by the at least one processor, position information of an antenna installed in a vehicle through the interface;
generating, by the at least one processor, position data indicating a location of the vehicle based on the position information of the antenna;
acquiring, by the at least one processor, information about change in an external appearance of the vehicle, wherein acquiring the information about the change in the external appearance includes acquiring information about opening of at least one door of the vehicle;

correcting, by the at least one processor, the position data of the vehicle based on the information about the change in the external appearance of the vehicle, wherein correcting the position data of the vehicle includes correcting the position data by adding half of a value of a width of the vehicle, increased due to the opening of the at least one door, as a first offset between a position of the antenna and a center of the width of the vehicle; and acquiring, by the at least one processor, information about a reference point in movement control of the vehicle, wherein generating the position data of the vehicle comprises generating the position data of the vehicle based on the information about the reference point.

9. The method according to claim 8, wherein the acquiring the information about the change in the external appearance of the vehicle comprises acquiring, by the at least one processor, the information about the change in the external appearance of the vehicle from a camera configured to photograph at least a part of the external appearance of the vehicle.

10. The method according to claim 8, further comprising acquiring, by the at least one processor, information about a person getting into the vehicle or getting out of the vehicle, wherein the correcting the position data of the vehicle comprises correcting, by the at least one processor, the position data of the vehicle based further on the information about the person.

11. The method according to claim 10, wherein the correcting the position data of the vehicle based on the information about the person comprises correcting, by the at least one processor, the position data of the vehicle by adding half of a value of a width of a road on which the person is located, as a second offset between the position of the antenna and the center of the width of the vehicle.

12. The method according to claim 8, wherein the acquiring the information about the change in the external appearance of the vehicle comprises:

receiving, by the at least one processor, a signal generated based on user input in response to the change in the external appearance of the vehicle through the interface; and acquiring, by the at least one processor, the information about the change in the external appearance of the vehicle based on the signal.

13. The method according to claim 8, further comprising providing, by the at least one processor, information about a position of the vehicle.

* * * * *